(12) United States Patent
Kitamorn et al.

(10) Patent No.: US 7,103,808 B2
(45) Date of Patent: Sep. 5, 2006

(54) APPARATUS FOR REPORTING AND ISOLATING ERRORS BELOW A HOST BRIDGE

(75) Inventors: Alongkorn Kitamorn, Austin, TX (US); Ashwini Kulkarni, Austin, TX (US); Gordon D. McIntosh, Austin, TX (US); Michael Anthony Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 10/411,464

(22) Filed: Apr. 10, 2003

(65) Prior Publication Data

US 2004/0205393 A1    Oct. 14, 2004

(51) Int. Cl.
*G06F 11/00* (2006.01)
*G06F 11/07* (2006.01)

(52) U.S. Cl. ............................. 714/44; 714/43; 714/9; 714/48

(58) Field of Classification Search .................... 714/9, 714/44
See application file for complete search history.

(56) References Cited

U.S. PATENT DOCUMENTS 5,815,647 A * 9/1998 Buckland et al. ............... 714/3
6,141,757 A * 10/2000 Seeker et al. ................. 726/22
6,223,299 B1 * 4/2001 Bossen et al. ................. 714/5
6,571,360 B1 * 5/2003 Drogichen et al. ........... 714/44
6,587,961 B1 * 7/2003 Garnett et al. ................ 714/11
6,938,114 B1 * 8/2005 Foster et al. ................ 710/200
2002/0010881 A1 * 1/2002 White ........................ 714/44
2004/0123188 A1 * 6/2004 Srinivasan et al. ........... 714/44

OTHER PUBLICATIONS

Designing Embedded Hardware by John Catsoulis Published by O'Reilly, Nov. 2002 ISBN: 0-596-00362-5.*

* cited by examiner

*Primary Examiner*—Scott Baderman
*Assistant Examiner*—Joseph Schell
(74) *Attorney, Agent, or Firm*—Duke W. Yee; Thomas E. Tyson; Francis Lammes

(57) ABSTRACT

A method, apparatus, and computer instructions for reporting errors occurring in a data processing system. Responsive to an error occurring in a host bridge in the data processing system, a determination is made as to whether a device required for generating an error report is located below the host bridge. Responsive to the device required for generating an error report being located below a host bridge, the host bridge is isolated from other portions of the data processing system, wherein only a processor analyzing the error is able to access the host bridge. An error reporting process is performed. The error reporting process is able to access the host bridge and the device.

24 Claims, 3 Drawing Sheets

100 DATA PROCESSING SYSTEM

APPARATUS FOR REPORTING AND ISOLATING ERRORS BELOW A HOST BRIDGE

BACKGROUND OF THE INVENTION

1. Technical Field

The present invention relates generally to an improved data processing system, and in particular a method and apparatus for handling errors. Still more particularly, the present invention provides a method and apparatus for reporting errors in a data processing system.

2. Description of Related Art

Data processing systems have become more complex. This complexity includes various types of resources in a data processing system. For example, a data processing system may include one or more architecturally distinct processors. In this type of system, multiple host bridges may be present for the numerous I/O adapter bus slots. These type of systems may be run in a partitioned or non-partitioned mode. In a partitioned mode, resources are allocated among different copies of an operating system or multiple heterogenous operating systems, which are run simultaneously on the data processing system. Such a partitioned data processing system is also referred to as a logical partitioned data processing system or as a LPAR data processing system.

In this type of complex multi-processor, multi-host-bridge system, when an I/O error occurs, it is desirable to isolate that error from the rest of the logical partitioned data processing system to allow the system to function without corrupting data in the system. Currently, this isolation is accomplished by preventing memory mapped input/output (MMIO) accesses to propagate from a host processor to I/O adapters beneath the host bridge in error state. This isolation is also accomplished by preventing direct memory access (DMA) accesses from propagating from an I/O adapter through the host bridge to system memory. DMA is an access in which an adapter attempts to send data to a resource, such as a memory. MMIO is a type of access in which a processor attempts to access an adapter. By isolating the system to a host bridge level, the rest of the system is able to continue to operate or at least enter into an error state that can later be analyzed and recovered.

One problem with this current solution is that in the process to reporting users to an error, a resource, such as chips and/or memory that the host processor needs to access to generate an error report, is located below the host bridge, which is in the error state. In other instances, a support processor for the system may be located below the host bridge in the error state. With the host bridge being isolated, certain support processor activities will be unable to complete.

Therefore, it would be advantageous to have an improved method, apparatus, and computer instructions for reporting errors when resources located below a host bridge need to be accessed to gather error information or transfer error information.

SUMMARY OF THE INVENTION

The present invention provides a method, apparatus, and computer instructions for reporting errors occurring in a data processing system. Responsive to an error occurring in a host bridge in the data processing system, a determination is made as to whether a device required for generating an error report is located below the host bridge. Responsive to the device required for generating an error report being located below a host bridge, the host bridge is isolated from other portions of the data processing system, wherein only a processor analyzing the error is able to access the host bridge. An error reporting process is performed. The error reporting process is able to access the host bridge and the device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
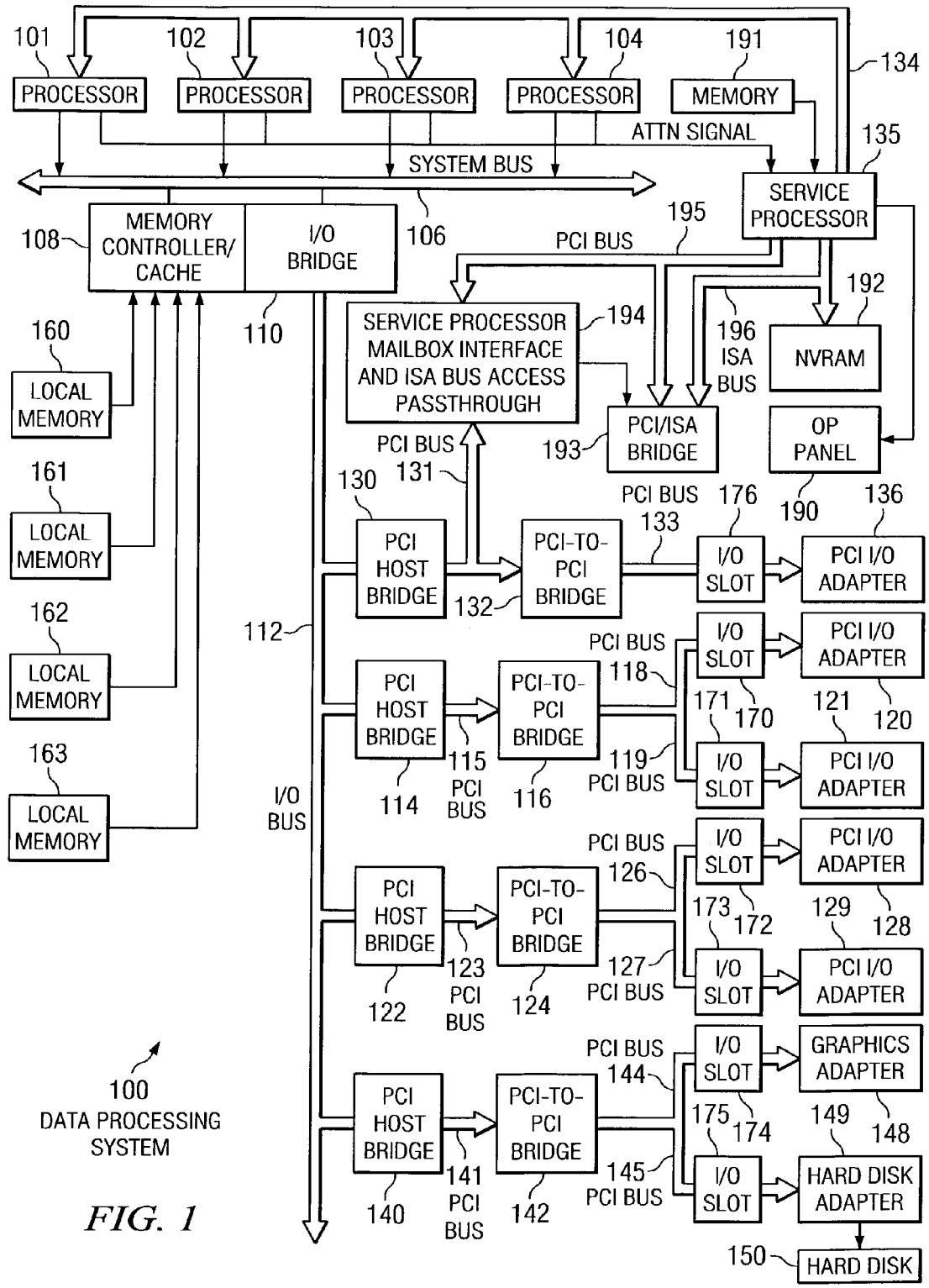
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted. The mechanism of the present invention may be applied to data processing systems running in both an LPAR mode and a non-LPAR mode.

If data processing system 100 is configured as a logical partitioned (LPAR) data processing system, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into local memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

A component is considered to be under another component if that component is on a lower level than the other component in a hierarchal or tree structure. For example, I/O 170 and I/O slot 171 are considered to be below PCI host bridge 114 in FIG. 1. Hard disk 150 and hard disk adapter 149 are considered to be below PCI host bridge 140 in FIG. 1. I/O slot 173, however, is not considered to be below PCI host bridge 140 because this component is located in a different branch.

Figure 2:
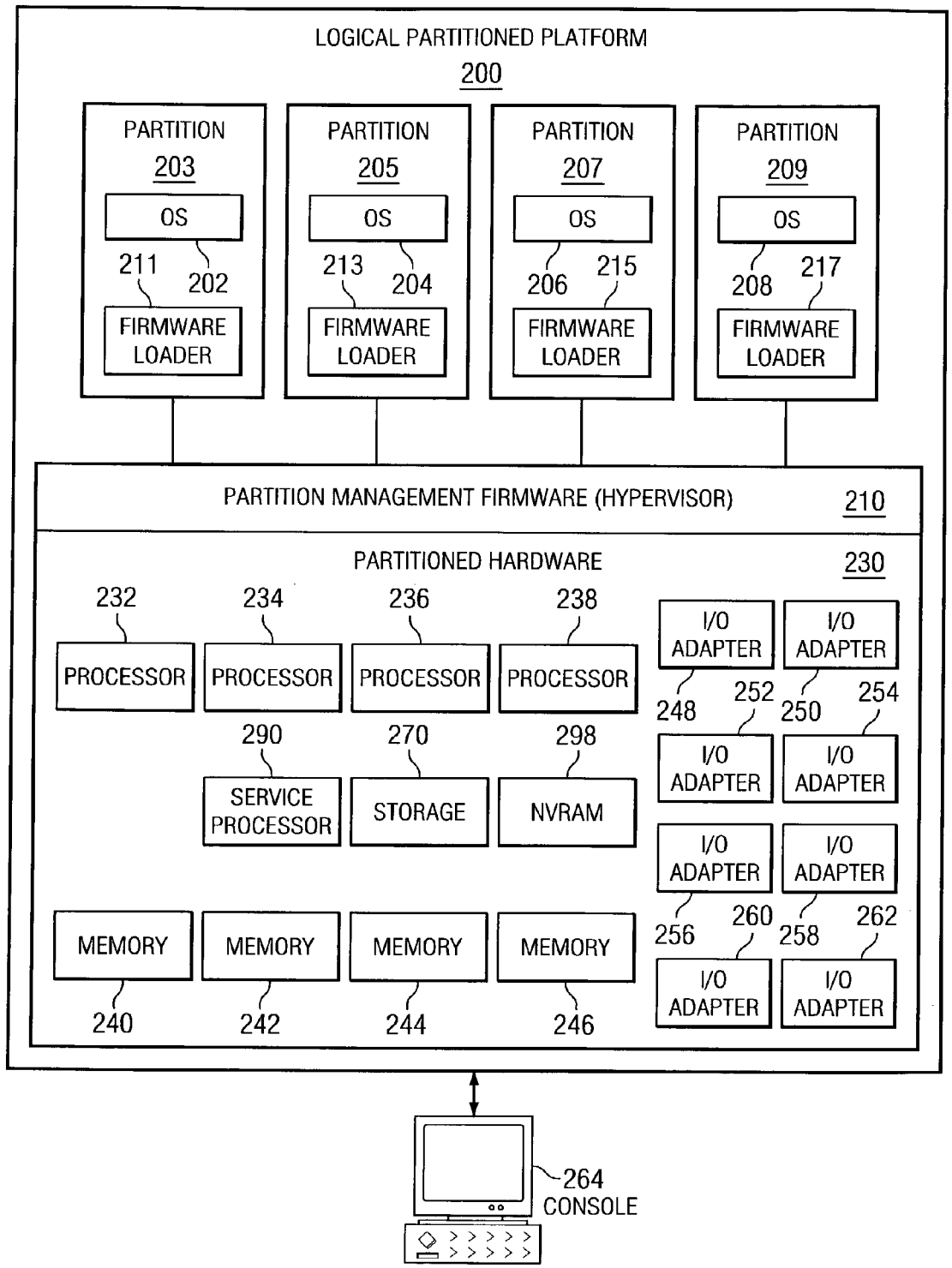
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions. If data processing system 100 is run in a non-partitioned mode, all of the resources are allocated to a single operating system. The present invention may be applied to both LPAR data processing systems and data processing systems running in a non-LPAR mode.

The present invention provides a method, apparatus, and computer instructions for reporting errors when an I/O failure occurs on a host bridge if access is required to resources below the host bridge to generate an error report. This access includes devices, such as a support processor, a memory, a set of serial ports, and/or any other resource that may be required to report errors. Access to a memory, such as a NVRAM, below a host bridge may be required to obtain data from the memory. Further, access to a support processor may be required to allow the support processor to complete activities that may be required to report error information. If the AIX or Linux debugger is enabled, then access to the serial port is required. If debugging is not enabled, then access to the serial port is not required. In these examples, the NVRAM is the memory in which error information is written. Another reason for clearing the path is if the host needs to send any mailbox commands to the support processor, such as heartbeats or error information. By clearing this path, a path to the floppy and parallel port is created, although such a path is not needed in this example.

If access to such a resource is required, the mechanism of the present invention clears a path to those resources to allow reporting of the errors. For example, if an I/O adapter error occurs, causing the host bridge associated with the adapter to go into error state, the host processor accessing the failed I/O adapter detects the error. The processor vectors to an error handling routine, which walks through registers for various chips, attempting to determine where the failure occurs. The host bridge on which the error occurred is placed into an error state. This state prevents damage or corruption of data in the rest of the system. Other processors and I/O adapters below other host bridges may continue to function.

The error handling routine will attempt to locate the failing adapter and its associated host bridge. As part of this error analysis, this routine will write data to the NVRAM associated with the service processor, such as NVRAM 192 in FIG. 1. The routine will write to a local terminal device associated with the serial port if the debugger is enabled, access a support processor, as well as other activities in handling the error. Previously, with this situation, the error state of the host bridge would not be clear regardless of which host bridge failed. If the system is operating in LPAR mode, the particular partition would fail, with the rest of the partitions continuing to run. If the data processing system is running in a non-LPAR mode, the data processing system goes into an error state with the error being reported. This reporting assumes that the failing host bridge did not include a resource, such as a support processor, NVRAM and/or serial ports. In a system containing resources that need to be accessed in generating an error report, the system would appear to be hung or non-responsive from the perspective of a user.

In an LPAR mode, the support processor would no longer function properly, the LPAR hardware management console (HMC) would lose contact and no error messages would be present on the next boot because access to the NVRAM could not occur. The HMC is used to configure, start, and stop various logical partitions and is implemented in a computer attached to the server through a serial port in these examples. With the mechanism of the present invention, the normal process is followed if access to a device below the host bridge is not required for properly reporting errors. If such an access is not required, the path is cleared by stopping access to the host bridge through halting DMA and MMIO access. Slots below the host bridge are frozen. Thereafter, limited access is enabled to allow the process to access the resources to obtain error information.

Figure 3:
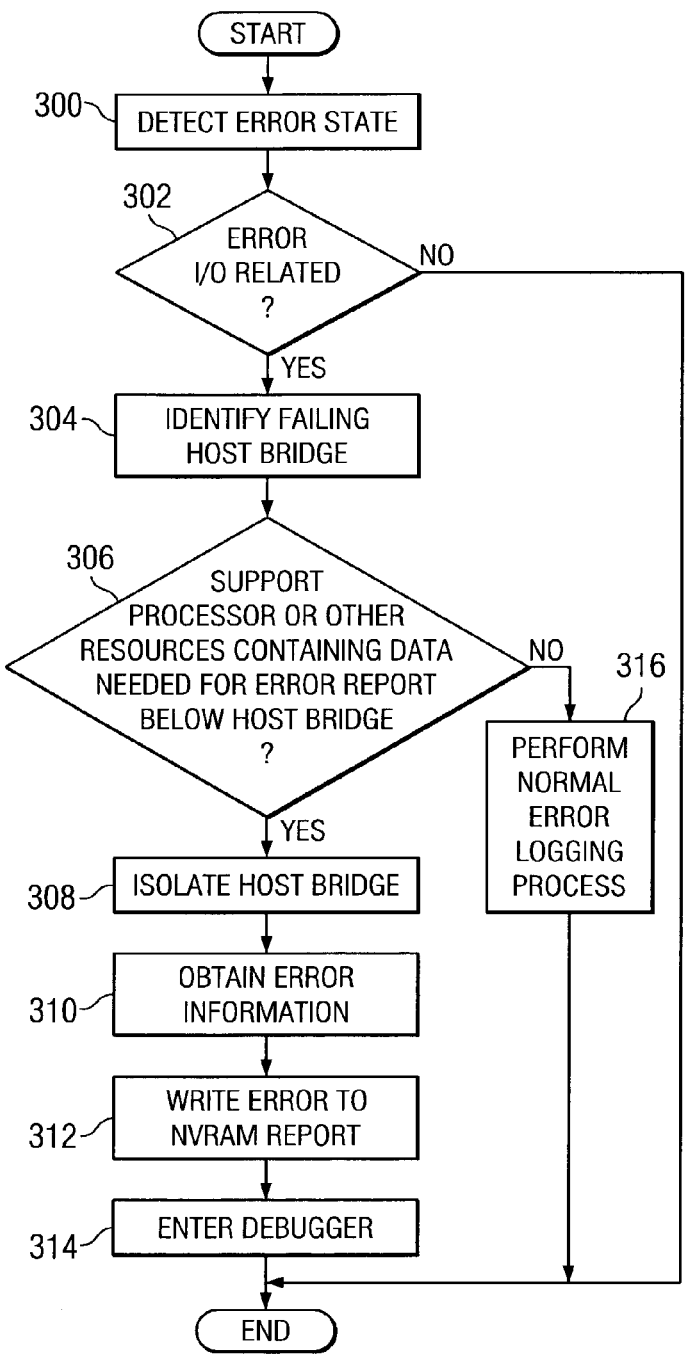
FIG. 3 is a flowchart of a process for handling reporting of an error in accordance with a preferred embodiment of the present invention.

Turning now to FIG. 3, a flowchart of a process for handling reporting of an error is depicted in accordance with a preferred embodiment of the present invention. The flowchart illustrated in FIG. 3 may be implemented in a firmware RTAS. This component is a routine for handling errors that are also referred to internally as a firmware non-maskable interrupt (FWNMI). This code is used to determine the failing FRU and return an identification of the failing FRU.

The process begins by detecting an error state (step 300). This error state is typically indicated by a processor attempting to access an I/O adapter in which an error occurs or when a process error occurs. A determination is then made as to whether the error is I/O related (step 302). In this example, the I/O system in data processing system 100 may include various hubs and bridges. These components are connected via remote I/O cables (RIO). If a bridge wants to inform a hub that it is in error state, the bridge will perform this action by returning FFs on the next load with BAD status on the load. That is what is meant by a status error in these examples. Other I/O errors may be, for example, timeouts, and request errors. The process in these examples is directed towards I/O errors, rather than status errors.

If the error is I/O related, the failing host bridge is identified (step 304). After identifying the failing host bridge, a determination is made as to whether a support processor, or other resources containing data needed for an error report, are located below the host bridge (step 306). If resources required for the error report are located below the host bridge, the host bridge is then isolated (step 308). Error information is then obtained (step 310). The error information is used to write an error report to NVRAM (step 312). Finally, a debugger is entered if one is available (step 314), with the process terminating thereafter.

Turning back to step 306, if resources containing data needed for the error report are not located below the host bridge, a normal error logging process is performed (step 316), with the process terminating thereafter. The process also terminates if the error is not I/O related in step 302.

Figure 4:
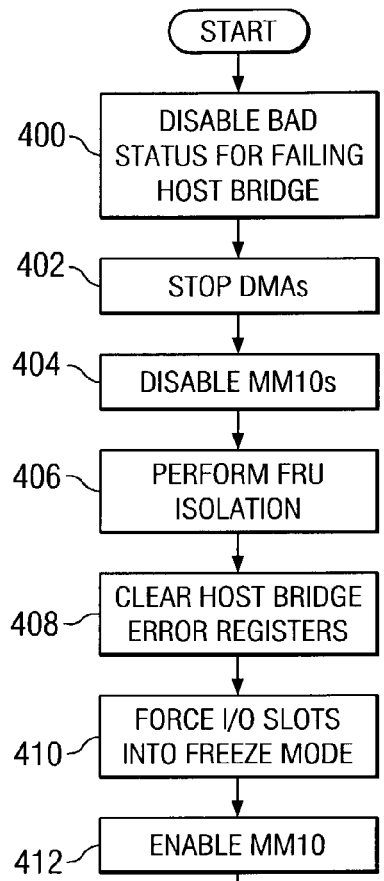
FIG. 4 is a flowchart of a process for accessing resources below a host bridge in accordance with a preferred embodiment of the present invention.

Turning now to FIG. 4, a flowchart of a process for accessing resources below a host bridge is depicted in accordance with a preferred embodiment of the present invention. The process illustrated in FIG. 4 is implemented in a firmware RTAS process in the depicted examples.

The process begins by disabling a bad status for the failing host bridge (step 400). By disabling the bad status, the occurrence of a second error is avoided. Next, DMA access to the host bridge is stopped (step 402). This type of DMA access is stopped by disabling the arbiter in the host bridge. Next, MMIOs are disabled (step 404). MMIOs are disabled by clearing an enabled peripheral address space enable bit in the host bridge register. Then, a normal field replaceable unit (FRU) isolation is performed (step 406). In step 406, a RTAS routine first determines which hub is in error state. This routine then determines which bridge below that hub is in error state. Thereafter, the routine determines which PCI host bridge on that bridge is in error state. The routine performs these processes by looking at registers in every chip in the path. Once the routine gets to the PCI host bridge, the routine then determines what type of IO error occurred by looking at other registers.

The RTAS routine then attempts to isolate to a single slot by looking at the failing address and command. Sometimes the routine can isolate to a single slot and sometimes the routine can only isolate to the slots below that PCI host bridge. Once all of this is done, an error log is created that contains data showing the location of the chips reporting the errors and this error log also contains the data in the error registers. The engineers looking at the error logs can use this information to attempt to correct the problem.

Next, host bridge error registers are cleared (step 408). Normally, clearing these registers would allow DMA access and MMIO access to occur. This type of access has been disabled as described above. Next, the I/O slots are forced into a freeze mode (step 410). This freeze mode is used to isolate the data processing system. Slots are isolated in a manner to prevent another component from accessing the slots and to prevent an adapter in the slot from accessing another component. In other words DMA and MMIO accesses are prevented.

In these examples, a freeze mode may be enforced upon the slots to isolate them. Enhanced error handling (EEH) is a feature provided on servers from IBM Corporation to place slots in a freeze mode. An example of a server computer provided by IBM, which incorporates this feature is an IBM eServer pSeries 630 system. Every adapter or integrated device on IBM EEH support servers is on its own PCI/PCIX bus. The chip directly attached to the adapter/integrated device supports EEH. Without EEH, if an adapter is defective and is pushing bad data or signaling an error condition to the host, that error could cause the whole system to crash. With EEH, the system does not crash. Instead, EEH isolates a bad adapter from the system by freezing the adapter. When the adapter is frozen, MMIO loads will return FFs, MMIO writes will be discarded, and DMAs will be blocked from memory. The device driver for that device recognizes that a return of FFs means the adapter is in error state. The device driver can now attempt to recover. The enabling or disabling of EEH is performed on a device by device basis. Some device drivers do not support this feature. The reason slots are frozen at this point is to force all slots into an isolated mode where the slots cannot cause addition errors or data corruption. In these examples, EEH is enabled for all slots, regardless of device driver support. An error is forced into the slot so that the adapter is now isolated from the system and can do no harm.

All slots cannot be forced to be isolated until the error has been cleared. As a result, in these examples, MMIOs and DMAs are temporarily stopped at the PCI host bridge level prior to clearing the error. Thereafter, the adapters are isolated at the slot level via the freezing process described above. Then, the ability to send mmio commands from the host is re-enabled.

An incorrect address is sent to slot to force an error on the slot. The forcing of the error on the slot with EEH enabled will isolate the slot from the system (frozen).

In step 410, configuration commands with an incorrect address are issued to all of the slots below the host bridge to force the slots into a freeze mode. MMIO is then re-enabled (step 412), with the process terminating thereafter. This type of access is required to access the resources, such as the NVRAM and the serial ports, located below the host bridge. This access was disabled earlier to avoid access to the slots that may lead to secondary errors that might result in check stops. At this point, access to the resources below the host bridge may occur to allow any error process to retrieve error data from devices below the host bridge. At this point, DMA access is still disabled.

Thus, the mechanism of the present invention provides an ability to obtain error data from the devices located below a host bridge in which an error occurs. The mechanism of the present invention clears a path to these devices by preventing memory mapped input/output activities or direct memory access to the host bridge. Slots below the host bridge are placed in into a freeze mode. Then, limited access is re-enabled to allow data to be retrieved from the resources below the host bridge. In these examples, MMIOs are the type of limited access that is re-enabled. In other words, access to a device or other resource is allowed, while accesses by the device or other resource below the bridge is blocked.

The depicted examples illustrate a multiple processor system. The mechanism of the present invention is not limited to such a system. This mechanism may be applied to other data processing system architectures, such as single processor data processing systems, in addition to multi processor data processing systems, which operate in either a logical partitioned mode or a non-logical partitioned mode.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reporting errors occurring in a data processing system, the method comprising:
   responsive to an error occurring in a host bridge in the data processing system, determining whether a device required for generating arm error report is located below the host bridge;
   responsive to the device required for generating an error report being located below a host bridge, isolating to host bridge from other portions of the data processing system above the host bridge; and
   performing an error reporting process, wherein the error reporting process is able to access the host bridge and the device.

2. The method of claim 1, wherein only a processor analyzing the error is able to access the host bridge.

3. The method of claim 1, wherein the device is one of a support processor, non volatile random access memory, or a serial port.

4. The method of claim 1, wherein the device is a support processor and wherein the error reporting process is performed by the support processor.

5. The method of claim 1, wherein the isolating step comprises:
   disabling direct memory access to the host bridge;
   disabling memory mapped input/output access to the host bridge;
   clearing error registers in the host bridge; and
   placing slots below the host bridge in a freeze mode.

6. The method of claim 1, wherein the error is an input/output error.

7. The method of claim 1 further comprising:
   halting input/output activity of processors other than the processor analyzing the error.

8. The method of claim 1 further comprising:
   initiating a debugger program after performing the error reporting process.

9. The method of claim 1, wherein the data processing system is one of a logical partitioned data processing system, a multi-processor data processing system, or a non-logical partitioned data processing system.

10. A method for reporting errors occurring in a data processing system, the method comprising:
    responsive to an input/output error occurring in the data processing system, determining whether a host bridge is located between at least one of a resource that needs to be accessed to obtain error information and a processor and a host processor;
    responsive to determining whether a host bridge is located between at least one of a resource that needs to be accessed to obtain error information and a processor and a host processor, isolating the host bridge from other portions of the data processing system above the host bridge, wherein only a processor analyzing the input/output error is able to access the host bridge;
    clearing error in the host bridge; and
    gathering error data from at least one of the resource and the processor.

11. A data processing system for reporting errors occurring in the data processing system, the data processing system comprising:
    determining means, responsive to an error occurring in a host bridge in the data processing system, for determining whether a device required for generating an error report is located below the host bridge;
    isolating means, responsive to the device required for generating an error report being located below a host bridge, for isolating the host bridge from other portions of the data processing system above the host bridge, wherein only a processor analyzing the error is able to access the host bridge; and
    performing means for performing an error reporting process.

12. The data processing system of claim 11, wherein the error reporting process is able to access the host bridge and the device.

13. The data processing system of claim 11, wherein the device is one of a support processor, non volatile random access memory, or a serial port.

14. The data processing system of claim 11, wherein the device is a support processor and wherein the error reporting process is performed by the support processor.

15. The data processing system of claim 11, wherein the isolating means comprises:
    first disabling means for disabling direct memory access to the host bridge;
    second disabling means for disabling memory mapped input/output access to the host bridge;
    clearing means for clearing error registers in the bout bridge; and placing means for placing slots below the host bridge in a freeze mode.

16. The data processing system of claim 11, wherein the error is an input/output error.

17. The data processing system of claim 11 further comprising:
halting means for halting input/output activity of processors other than the processor analyzing the error.

18. The data processing system of claim 11 further comprising:
initiating means for initiating a debugger program after performing the error reporting process.

19. The data processing system of claim 11, wherein the data processing system is one of a logical partitioned data processing system, a multi-processor data processing system, or a non-logical partitioned data processing system.

20. A data processing system for reporting errors occurring in a data processing system, the data processing system comprising:
determining means, responsive to an input/output error occurring in the data processing system, for determining whether a host bridge is located between at least one of a resource that needs to be accessed to obtain error information and a processor and a host processor;
isolating means, responsive to determining whether a host bridge is located between at least one of a resource that needs to be accessed to obtain error information and a processor and a host processor, for isolating the host bridge from other portions of the data processing system above the host bridge, wherein wily a processor analyzing the input/output error is able to access the host bridge;
clearing means for clearing error in the host bridge; and
gathering means for gathering error data from at lean one of the resource and the processor.

21. A data processing system comprising:
a bus system;
a memory connected to the bus system, wherein the memory includes a set of instructions; and
a processing unit having a plurality of processors and being connected to the bus system, wherein the processing unit executes the set of instuctions to;
determine whether b device required for generating an error report is located below the host bridge in response to an error occurring in a host bridge in the data processing system;
isolate the host bridge from other portions of the data processing system above the host bridge, wherein only a processor analyzing the error is able to access the host bridge, in response to the device required for generating an error report being located below a host bridge; and
perform an error reporting process.

22. A data processing system for reporting errors occurring in a data processing system comprising:
a bus system;
a memory connected to the bus system, wherein the memory includes a set of instructions; and
a processing unit having a plurality of processors and being connected to the bus system, wherein the processing unit executes the set of instructions to;
determine whether a host bridge is located between at least one of a resource that needs to be accessed to obtain error information and a processor and a host processor, in response to an input/output error occurring in the data processing system;
isolate the host bridge from other portions of the data processing system above the host bridge, in response to determining whether a host bridge is located between at least one of a resource that needs to be accessed to obtain error information and a processor and a host processor, wherein only a processor analyzing the input/output error is able to access the host bridge;
clear error in the host bridge; and
gather error data from at least one of the resource and the processor.

23. A computer program product in a computer readable recordable medium for reporting errors occurring in a data processing system, the computer program product comprising:
first instructions, responsive to an error occurring in a host bridge in the data processing system, for determining whether a device required for generating an error report is located below the host bridge;
second instructions, responsive to the device required for generating an error report being located below a host bridge, for isolating the host bridge from other portions of the data processing system above the host bridge, wherein only a processor analyzing the error is able to access the host bridge; and
third instuctions for performing an error reporting process.

24. A computer program product in a computer readable recordable medium for reporting errors occurring in a data processing system, the computer program product comprising:
first instructions, responsive to an input/output error occurring in the data processing system, for determining whether a host bridge is located between at least one of a resource that needs to be accessed to obtain error information and a processor and a host processor;
second instructions, responsive to determining whether a host bridge is located between at least one of a resource that needs to be accessed to obtain error information and a processor and a host processor, for isolating the host bridge from other portions of the data processing system above the host bridge, wherein only a processor analyzing the input/output error is able to access the host bridge;
third instructions for clearing error in the host bridge; and
fourth instructions for gathering error data from at least one of the resource and the processor.

* * * * *